(12) United States Patent
Iwamura et al.

(10) Patent No.: US 8,670,375 B2
(45) Date of Patent: Mar. 11, 2014

(54) TRACKING AREA SETTING APPARATUS, USER EQUIPMENT, AND TRACKING AREA SETTING METHOD

(75) Inventors: Mikio Iwamura, Yokohama (JP); Takehiro Nakamura, Yokohama (JP); Yasuhiro Kato, Yokohama (JP); Wuri Andarmawanti Hapsari, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 318 days.

(21) Appl. No.: 12/524,810

(22) PCT Filed: Jan. 30, 2008

(86) PCT No.: PCT/JP2008/051448
§ 371 (c)(1),
(2), (4) Date: Jul. 28, 2009

(87) PCT Pub. No.: WO2008/093750
PCT Pub. Date: Aug. 7, 2008

(65) Prior Publication Data
US 2010/0120448 A1 May 13, 2010

(30) Foreign Application Priority Data
Feb. 2, 2007 (JP) ................................. 2007-024894

(51) Int. Cl.
*H04W 4/00* (2009.01)
(52) U.S. Cl.
USPC ....................................... 370/328; 455/435.1
(58) Field of Classification Search
USPC ..................................................... 455/435.1
See application file for complete search history.

(56) References Cited

U.S. PATENT DOCUMENTS

| 5,649,286 A * | 7/1997 | Frerking .................... 455/435.1 |
| 2005/0186961 A1 * | 8/2005 | Aikawa et al. ............. 455/435.1 |

FOREIGN PATENT DOCUMENTS

| JP | 2001169332 A | 6/2001 |
| JP | 2002-142243 A | 5/2002 |
| JP | 2004-228781 A | 8/2004 |
| JP | 2005-86560 A | 3/2005 |
| WO | 00/03557 A1 | 1/2000 |
| WO | 01/45450 A2 | 6/2001 |
| WO | 2004/089026 A1 | 10/2004 |

OTHER PUBLICATIONS

Ericsson "Tracking Area Concept" 3GPP TSG-RAN Meeting #55, St Louis, US, Feb. 12-16, 2007, R3-070143.*
Lucent Technologies "Hierarchical Tracking Areas in the evolved system" 3GPP TSG SA WG2 Architecture—S2#52, May 8-12, 2006, Shanghai, China, S2-061434.*

(Continued)

*Primary Examiner* — Joseph Bednash
(74) *Attorney, Agent, or Firm* — Osha Liang LLP (57) ABSTRACT

A tracking area setting apparatus is disclosed that includes a service request measurement unit measuring a frequency of occurrence of a service request transmitted by a user equipment terminal to a cell where the user equipment terminal is located based on a paging channel transmitted in all cells belonging to a tracking area where the user equipment terminal is located, the user equipment terminal being a target user equipment terminal to receive a call, the tracking area including one or more cells and a tracking area determination unit determining whether a number of the frequency of occurrence of the service request in a predetermined cell is equal to or greater than a predetermined threshold value based on the frequency of occurrence of the service request and, when determining yes, separate the predetermined cell from the tracking area to which the predetermined cell belongs.

6 Claims, 8 Drawing Sheets

(56) References Cited

OTHER PUBLICATIONS

LG Electronics "UE assisted Tracking Area Update", 3GPP TSG RAN WG2#57bis, St. Julian's, Malta, Mar. 26-30, 2007, R2-071325.*

Vodafone "Tracking Area Concepts" 3GPP TSG CT WG1 Meeting #45, Vancouver, Canada: Feb. 5-9, 2007, C1-070353.*

Vodafone "Geographical Hysteresis for Tracking Area Update", 3GPP TSG CT WG1 Meeting #48, Vienna, Austria, Aug. 20-24, 2007, C1-071672.*

3GPP TR 25.814 V7.0.0, Jun. 2006, "Physical layer aspects for evolved Universal Terrestrial Radio Access (UTRA)", 126 pages.

3GPP TSG RAN WG2 Ad Hoc on LTE, Jun. 27-30, 2006, Cannes, France, R2-061929, "Standardisation policy for plug and play RAN," 4 pages.

3GPP TS 23.122 V7.7.0 Dec. 2006, "Non-Access-Stratum (NAS) functions related to Mobile Station (MS) in idle mode," 34 pages.

International Search Report issued in PCT/JP2008/051448, mailed on May 13, 2008, with translation, 5 pages.

Written Opinion issued in PCT/JP2008/051448, mailed on May 13, 2008, 3 pages.

Office Action in corresponding Japanese application No. 2011P00389 dated Aug. 6, 2013 (9 pages).

Extended European Search Report dated Nov. 21, 2013 for European Application No. 08704211.5 (8 pages).

* cited by examiner

| TRACKING AREA | CELL BELONGING TO TRACKING AREA | FREQUENCY OF OCCURRENCE OF SERVICE REQUEST |
|---|---|---|
| TA $204_1$ | CELL $202_1$ | |
| | CELL $202_2$ | |
| | CELL $202_3$ | |
| | CELL $202_4$ | |
| TA $204_2$ | CELL $202_6$ | |
| | CELL $202_7$ | |
| TA $204_3$ | CELL $202_5$ | |
| | CELL $202_8$ | |

FIG.4

| DESTINATION TRACKING AREA | CELL BELONGING TO DESTINATION TRACKING AREA | FREQUENCY OF OCCURRENCE OF TRACKING AREA UPDATE |
|---|---|---|
| TA $204_1$ | CELL $202_1$ | |
| | CELL $202_2$ | |
| | CELL $202_3$ | |
| TA $204_2$ | CELL $202_4$ | |
| | CELL $202_6$ | |
| | CELL $202_7$ | |
| TA $204_3$ | CELL $202_5$ | |
| | CELL $202_8$ | |

| TRACKING AREA | CELL BELONGING TO TRACKING AREA (DESTINATION CELL) | SOURCE CELL | FREQUENCY OF OCCURRENCE OF TRACKING AREA UPDATE |
|---|---|---|---|
| TA $204_1$ | CELL $202_1$ | CELL $202_4$ | |
| | | CELL $202_5$ | |
| | | CELL $202_6$ | |
| | | CELL $202_7$ | |
| | | CELL $202_8$ | |
| | CELL $202_2$ | CELL $202_4$ | |
| | | CELL $202_5$ | |
| | | CELL $202_6$ | |
| | | CELL $202_7$ | |
| | | CELL $202_8$ | |
| | CELL $202_3$ | CELL $202_4$ | |
| | | CELL $202_5$ | |
| | | CELL $202_6$ | |
| | | CELL $202_7$ | |
| | | CELL $202_8$ | |
| TA $204_2$ | CELL $202_4$ | CELL $202_1$ | |
| | | CELL $202_2$ | |
| | | CELL $202_3$ | |
| | | CELL $202_5$ | |
| | | CELL $202_8$ | |
| | CELL $202_6$ | CELL $202_1$ | |
| | | CELL $202_2$ | |
| | | CELL $202_3$ | |
| | | CELL $202_5$ | |
| | | CELL $202_8$ | |
| | CELL $202_7$ | CELL $202_1$ | |
| | | CELL $202_2$ | |
| | | CELL $202_3$ | |
| | | CELL $202_5$ | |
| | | CELL $202_8$ | |
| TA $204_3$ | CELL $202_5$ | CELL $202_1$ | |
| | | CELL $202_2$ | |
| | | CELL $202_3$ | |
| | | CELL $202_4$ | |
| | | CELL $202_6$ | |
| | | CELL $202_7$ | |
| | CELL $202_8$ | CELL $202_1$ | |
| | | CELL $202_2$ | |
| | | CELL $202_3$ | |
| | | CELL $202_4$ | |
| | | CELL $202_6$ | |
| | | CELL $202_7$ | |

TRACKING AREA SETTING APPARATUS, USER EQUIPMENT, AND TRACKING AREA SETTING METHOD

TECHNICAL FIELD

The present invention generally relates to an LTE (Long Term Evolution) system, and more particularly to a tracking area setting apparatus, user equipment, and a tracking area setting method.

BACKGROUND ART

As a next-generation system of the W-CDMA (Wideband Code Division Multiple Access) and the HSDPA (High Speed Downlink Packet Access) which are collectively known as a UMTS (Universal Mobile Telecommunications System), an LTE system has been studied by 3GPP ($3^{rd}$ Generation Partnership Project) which is a standards body of UMTS. In the LTE system as a radio access system, an OFDM (Orthogonal Frequency Division Multiplexing) system and an SC-FDMA (Single-Carrier Frequency Division Multiple Access) system have been studied to be applied to the downlink communication system and the uplink communication system, respectively (see, for example, Non Patent Document 1).

In a mobile communication system, an information item indicating the location of user equipment (hereinafter, the user equipment may be referred to as a user equipment terminal) waiting for a call (in idle mode) is associated with the user equipment terminal, and the associated information is stored by using a tracking area as a unit. The tracking area corresponds to a Location Area (LA) in the UMTS or a Routing Area (RA).

In each cell, an identifier indicating the tracking area to which the cell belongs is reported. The tracking area to which a user equipment terminal in idle mode belongs is registered by a location registration. A user equipment terminal stores the identifier indicating the tracking area registered by the location registration. Further, upon being moved, the user equipment terminal receives the reported identifier of the tracking area and determines whether the tracking area is changed. For example, when the user equipment terminal is moved from a cell (first cell) to an adjacent cell (second cell) and then determines that a received identifier indicating the tracking area reported in the second cell is different from the identifier indicating the tracking area that is currently registered, the user equipment terminal accesses by using an uplink and performs the updates the location registration. The update of the location registration is called a Tracking Area Update (TAU). To perform the TAU, it is necessary for the user equipment terminal to use an uplink. Therefore, if the frequency (number) of performing the tracking area update (TAU) increases, the energy of the battery of the user equipment terminal may be wasted even when the user equipment terminal is in idle mode. Because of the feature, from the viewpoint of reducing the burden of the tracking area update (TAU), it may be preferable to increase the size of the tracking area.

When there is a call for a user equipment terminal, the mobile communication network pages all the cells of the tracking area currently registered as the tracking area of the user equipment terminal. Upon being paged, the user equipment terminal accesses (i.e., transmits a service request to) the cell where the user equipment terminal is located (hereinafter, the cell may be referred to as a serving cell) so that the call is established. However, the paging is performed even in the cells where the user equipment terminal is not located. Therefore, when the number of cells where the paging is performed is too many, many downlink radio resources may be of no use (wasted). From the viewpoint of reducing the overhead of the paging, it may be preferable to reduce the size of the tracking area. As described above, there is a trade-off relationship between the burden of performing the tracking area update (TAU) and the overhead of the paging. Therefore, it may be necessary to adequately determine (design) the tracking area (more specifically a correspondence relationship (combination) between the tracking area and the cells belonging to the tracking area).

Non Patent Document 1: 3GPP TR 25.814 (V7.0.0) "Physical Layer Aspects for Evolved UTRA," June 2006

Non Patent Document 2: 3GPP R2-061929 June 2006

DISCLOSURE OF INVENTION

Problems to be Solved by the Invention

In a conventional system such as the UTMS, in a case where a new cell is introduced, the tracking area to which the new cell is to belong is determined (designed) by the consideration of the estimation of the frequency (i.e., burden) of the tracking area update (TAU) and the overhead (burden) of the paging based on the population distribution of the area where the new cell is to be installed. Especially, if the tracking area is incorrectly determined based on the inaccurate status (information) of the cells adjacent to each other in a radio communication system, a large number of tracking area updates (TAU) may have to be initiated, resulting in that the system capacity may be severely reduced (impaired). To accurately recognize the status of radio transmissions in a new cell, for example, there is a conventional method in which a new base station is installed to transmit a pilot signal therefrom, and a dedicated vehicle on which measuring equipment is mounted moves around within the cell to measure the received quality of the pilot signal at many points. However, this method requires much labor. Further, in an actual process of designing (determining) the tracking area, it may be required to take into consideration a special area in the tracking area where the tracking area update (TAU) may occur in high concentration. Such a special area includes a train station, highway roads and the like, which may make it more difficult (cumbersome) to design the tracking area.

To reduce the labor for designing the tracking area, 3GPP proposes a method in which when a new base station for the LTE system is installed, parameters necessary for a new base station can be automatically obtained simply by connecting the new base station and the network by using a cable. Particularly, when considering that more and more base stations for domestic homes and compact base stations are required to be installed to meet the future communication demands, it may be desirable to have such an automatic setting function.

However, this proposal is still in the conceptual stage and specific configurations of the base station and user equipment have not been proposed yet.

The present invention may solve at least one of the problems described above and may provide a tracking area setting apparatus, user equipment, and a tracking area setting method capable of automatically optimizing the tracking area.

Means for Solving the Problems

According to an aspect of the present invention, there is provided a tracking area setting apparatus including a service request measurement unit measuring a frequency of occurrence of a service request transmitted by a user equipment terminal to a cell where the user equipment terminal is located based on a paging channel transmitted in all cells belonging to a tracking area where the user equipment terminal is located, the user equipment terminal being a target user equipment terminal to receive a call, the tracking area including one or more cells, and a tracking area determination unit determining whether a number of the frequency of occurrence of the service request in a predetermined cell is equal to or greater than a predetermined threshold value based on the frequency of occurrence of the service request and, when determining that the number of frequency of occurrence of the service request in the predetermined cell is equal to or greater than the predetermined threshold value, separate the predetermined cell from the tracking area to which the predetermined cell belongs.

By having the configuration described above, it may become possible to optimally determine (design) the tracking area based on the frequency of the occurrence of the service request of a random access procedure initiated by the user equipment terminal.

According to another aspect of the present invention, there is provided a tracking area setting apparatus including a location registration measurement unit measuring a frequency of occurrence of an update of a location registration, the update of the location registration being initiated by a user equipment terminal based on a reported identifier of a tracking area, the identifier being reported from each cell of each tracking area including one or more cells; and a tracking area determination unit, based on the frequency of occurrence of the location registration, combine a first tracking area having a value of the frequency of occurrence of the location registration greater than a predetermined value and a second tracking area to which a cell belongs, the cell adjoining to the first tracking area.

By having the configuration described above, it may become possible to optimally determine (design) the tracking area based on the tracking area update (TAU) initiated by the user equipment terminal.

According to another aspect of the present invention, there is provided a user equipment terminal including a cell identifier report unit transmitting a tracking area update request including an information item indicating a cell where the user equipment terminal had been located just before a change of the tracking area where the user equipment terminal is located, the user equipment terminal accessing by using an uplink upon the change of the tracking area where the user equipment terminal is located, the access being initiated based on an identifier of the tracking area, the identifier being reported from each cell of each tracking area including one or more cells.

By having the configuration described above, the user equipment terminal may transmit the tracking area update request including an information item indicating a cell where the user equipment terminal had been located just before a change of the tracking area where the user equipment terminal is located; therefore, it may become possible to optimally determine (design) the tracking area based on the tracking area update (TAU) initiated by the user equipment terminal.

According to another aspect of the present invention, there is provided a tracking area setting method including a paging channel transmission step in which a base station transmits a paging channel in each of one or more cells belonging to a tracking area where a target user equipment terminal to receive a call is located, a service request transmission step in which, based on the paging channel, the user equipment terminal transmits a service request to a cell where the user equipment terminal is located, a service request measurement step in which a tracking area setting apparatus measures a frequency of occurrence of the service request, a service request occurrence frequency determination step in which, based on the frequency of occurrence of the service request, the tracking area setting apparatus determines whether the frequency of occurrence of the service request in a predetermined cell is equal to or greater than a predetermined value; and a tracking area separation step in which, when determining that the frequency of occurrence of the service request in the predetermined cell is equal to or greater than the predetermined value, the tracking area setting apparatus separates the predetermined cell from the tracking area to which the predetermined cell belongs.

By doing this way, it may become possible to optimally determine (design) the tracking area based on the frequency of the occurrence of the service request of a random access procedure initiated by the user equipment terminal.

According to another aspect of the present invention, there is provided a tracking area setting method including a location registration update step in which a user equipment terminal initiates a location registration based on an identifier of a tracking area reported from each cell of each tracking area including one or more cells, a location registration measurement step in which a tracking area setting apparatus measures a frequency of occurrence of the location registration; and a tracking area combining step in which, based on the frequency of occurrence of the location registration, the tracking area setting apparatus combines a first tracking area having a value of the frequency of occurrence of the location registration equal to or greater than a predetermined threshold value and a second tracking area to which a cell belongs, the cell adjoining to the first tracking area.

By doing this way, it may become possible to automatically optimize the tracking area based on the tracking area update initiated by the user equipment terminal.

Advantageous Effect of the Invention

According to an embodiment of the present invention, it may become possible to provide a tracking area setting apparatus, user equipment, and a tracking area setting method capable of automatically optimizing the tracking area.

EXPLANATION OF REFERENCES

50, $50_1$, $50_2$, $50_3$, $50_4$: USER EQUIPMENT TERMINAL(S)
100: TRACKING AREA SETTING APPARATUS
102: NETWORK INTERFACE
104: SERVICE REQUEST MEASUREMENT SECTION
106: TRACKING AREA UPDATE MEASUREMENT SECTION
108: TRACKING AREA DETERMINATION SECTION
110: CONTROL SECTION
112: STORAGE SECTION
114: TRACKING AREA-CELL MAPPING TABLE
116: USER EQUIPMENT-TRACKING AREA MAPPING TABLE
118: USER EQUIPMENT CONTEXT
200, $200_1$, $200_2$, $200_3$, $200_4$, $200_5$, $200_6$, $200_7$, $200_8$: BASE STATIONS
202, $202_1$, $202_2$, $202_3$, $202_4$, $202_5$, $202_6$, $202_7$, $202_8$: CELLS
204, $204_1$, $204_2$, $204_3$: TRACKING AREAS
300: ACCESS GATEWAY (aGW)
400: HOME LOCATION REGISTER (HLR)

BEST MODE FOR CARRYING OUT THE INVENTION

Next, a best mode for carrying out the present invention is described based on the following embodiments with reference to the accompanying drawings.

Throughout the figures, the same reference numerals are used for the elements having the same or equivalent functions and repeated descriptions may be omitted.

Figure 1:
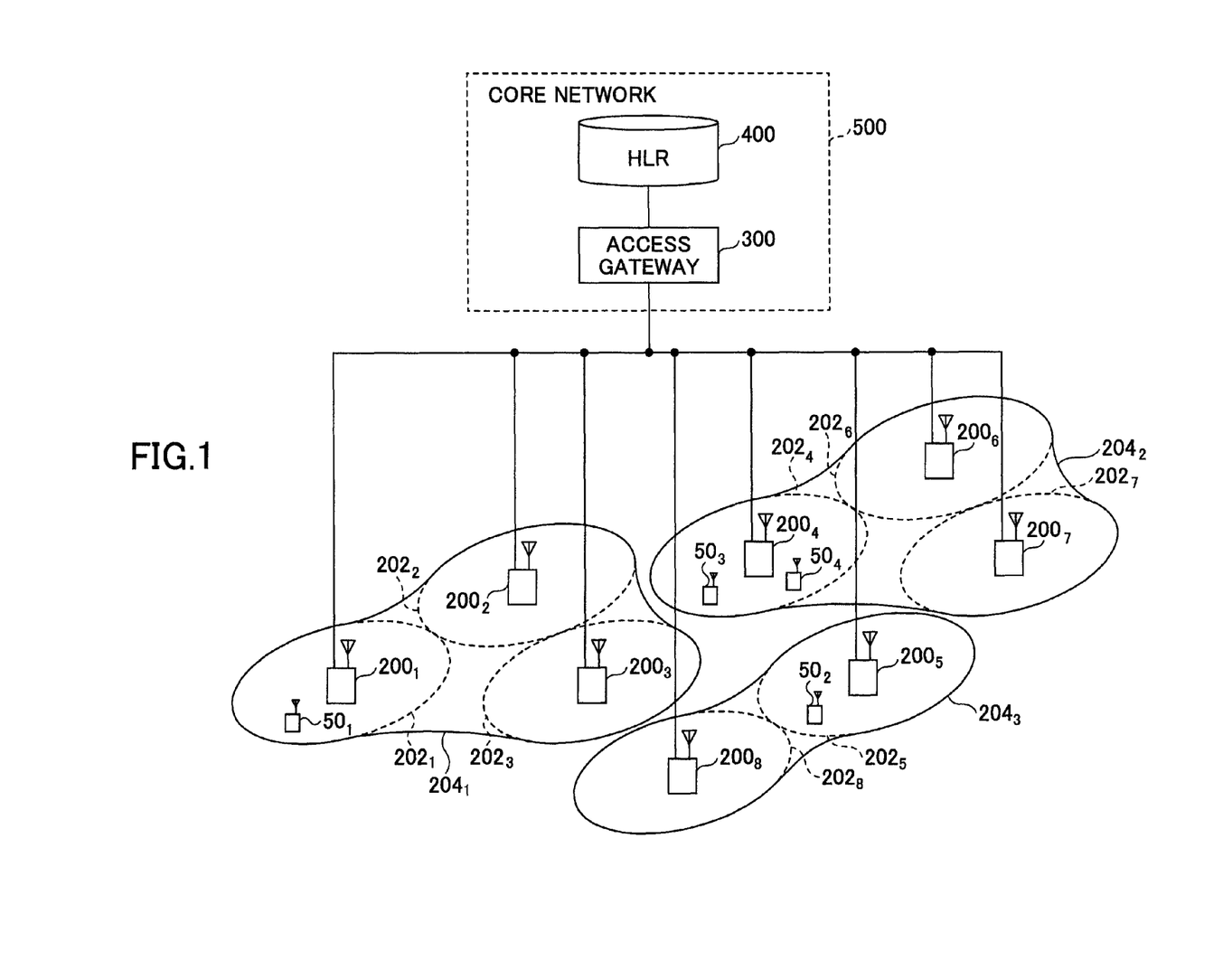
FIG. 1 is a drawing showing an exemplary configuration of a mobile communication system having a tracking area setting apparatus according to an embodiment of the present invention.

FIG. 1 shows an exemplary configuration of a mobile communication system having a tracking area setting apparatus according to an embodiment of the present invention.

The mobile communication system in FIG. 1 may be applied to, for example, the Evolved UTRA (UMTS Terrestrial Radio Access) and the UTRAN (UMTS Terrestrial Radio Access Network) (a.k.a Long Term Evolution, or Super 3G).

The mobile communication system includes base stations (eNB or eNode B) $200_m$ (suffix "m" refers to an integer greater than zero (0)), and user equipment terminals (UE) $50_n$ (suffix "n" refers to an integer greater than zero (0)). FIG. 1 shows a case where the mobile communication system includes base stations $200_1$, $200_2$, $200_3$, $200_4$, $200_5$, $200_6$, $200_7$, and $200_8$ and user equipment terminals $50_1$, $50_2$, $50_3$, and $50_4$. The cells covered by the base stations $200_1$, $200_2$, $200_3$, $200_4$, $200_5$, $200_6$, $200_7$, and $200_8$ are called cells $202_1$, $202_2$, $202_3$, $202_4$, $202_5$, $202_6$, $202_7$, and $202_8$, respectively.

As shown in FIG. 1, the mobile communication system may further include a core network 500 having a Home Location Register (HLR) 400 and an access gateway (aGW) (hereinafter may be referred to as an access gateway device) 300. However, the access gateway (aGW) 300 may be included in a network other than the core network 500. Further, the access gateway (aGW) 300 may be separated into two logical entities, the control plane (C-plane) and the user plane (U-plane) logical entity, to provide the Mobility Management Entity (MME) and the User Plane Entity (UPE). The Home Location Register (HLR) 400 stores an identifier of the access gateway managing the user equipment terminal $50_n$.

In this embodiment, as an example, a case is described where the cells $202_1$, $202_2$, and $202_3$ belong to the tracking area $204_1$, the cells $202_4$, $202_6$, and $202_7$ belong to the tracking area $204_2$, and the cells $202_5$, and $202_8$ belong to the tracking area $204_3$. However, the cell belonging to the tracking area may be adequately changed.

When there is an incoming call to a user equipment terminal $50_n$, the access gateway 300 already knows the tracking area where the paging is to be performed because the access gateway 300 has the information of the tracking area that has been registered by the location registration initiated by the user equipment terminal $50_n$. Therefore, the access gateway 300 pages a message to all the base stations belonging to the registered tracking area. In other words, when the user equipment terminal $50_n$ is in idle mode, the connection with the user equipment terminal $50_n$ is not being established; therefore it is not possible to determine the serving cell of the user equipment terminal $50_n$ (a cell to which the user equipment terminal belongs). As a result, the core network 500 is required to transmit the paging channel (PCH) to all the cells belonging to the registered tracking area.

The base station $200_m$ transmits the paging channel (PCH) based on the paging message transmitted from the access gateway 300. As a result, the paging channel (PCH) is transmitted from the cell belonging to the tracking area where the user equipment terminal $50_n$ is located to the user equipment terminal $50_n$. In this case, for example, the cell belonging to the tracking area where the user equipment terminal $50_n$ is located transmits a paging indicator channel (PICH) and then transmits the paging channel (PCH). The paging channel (PCH) may include the International Mobile Subscriber Identifier (IMSI)/(or) Temporary Mobile Subscriber Identifier (TMSI) and the cause ID indicating a type of communication.

Upon receiving the paging channel (PCH), the user equipment terminal $50_n$ determines whether the paging channel (PCH) includes the global ID (i.e., IMSI/TMSI) of the user equipment terminal $50_n$. When determining that the paging channel (PCH) includes the global ID of the user equipment terminal $50_n$, the user equipment terminal $50_n$ accesses the cell where the user equipment terminal is located (hereinafter may be referred to as a serving cell) by using a random access channel (RACH). Then, a communication link between the user equipment terminal $50_n$ and the serving cell is established.

More specifically, the user equipment terminal $50_n$ initiates an uplink random access procedure to transmit the random access channel (RACH) to the serving cell. Next, the serving cell transmits a response to the transmission of the RACH (hereinafter may be referred to as an RACH response). Based on the RACH response, the user equipment terminal $50_n$ sends a service request indicating the transmission as the response to the paging by using an uplink.

When the user equipment terminal $50_n$ in idle mode waiting for an incoming call is moved so that the tracking area of the equipment terminal $50_n$ is changed, the user equipment terminal $50_n$ initiates a tracking area update (TAU). The user equipment terminal $50_n$ in idle mode receives an identifier of the reported tracking area, so that the user equipment terminal $50_n$ can recognize (grasp) the tracking area to which the user equipment terminal $50_n$ belongs. For example, in a case where the user equipment terminal $50_n$ is moved to an adjacent cell, when it is determined that the identifier of the tracking area which is being reported in the adjacent cell is different from the identifier of the tracking area which is currently location registered, the user equipment terminal $50_n$ accesses by using an uplink to update the location registration of the identifier of the tracking area of the user equipment terminal $50_n$. As a result of the update of the location registration, the user equipment terminal $50_n$ and access gateway 300 stores the updated identifier of the tracking area which has been location registered.

Figure 2:
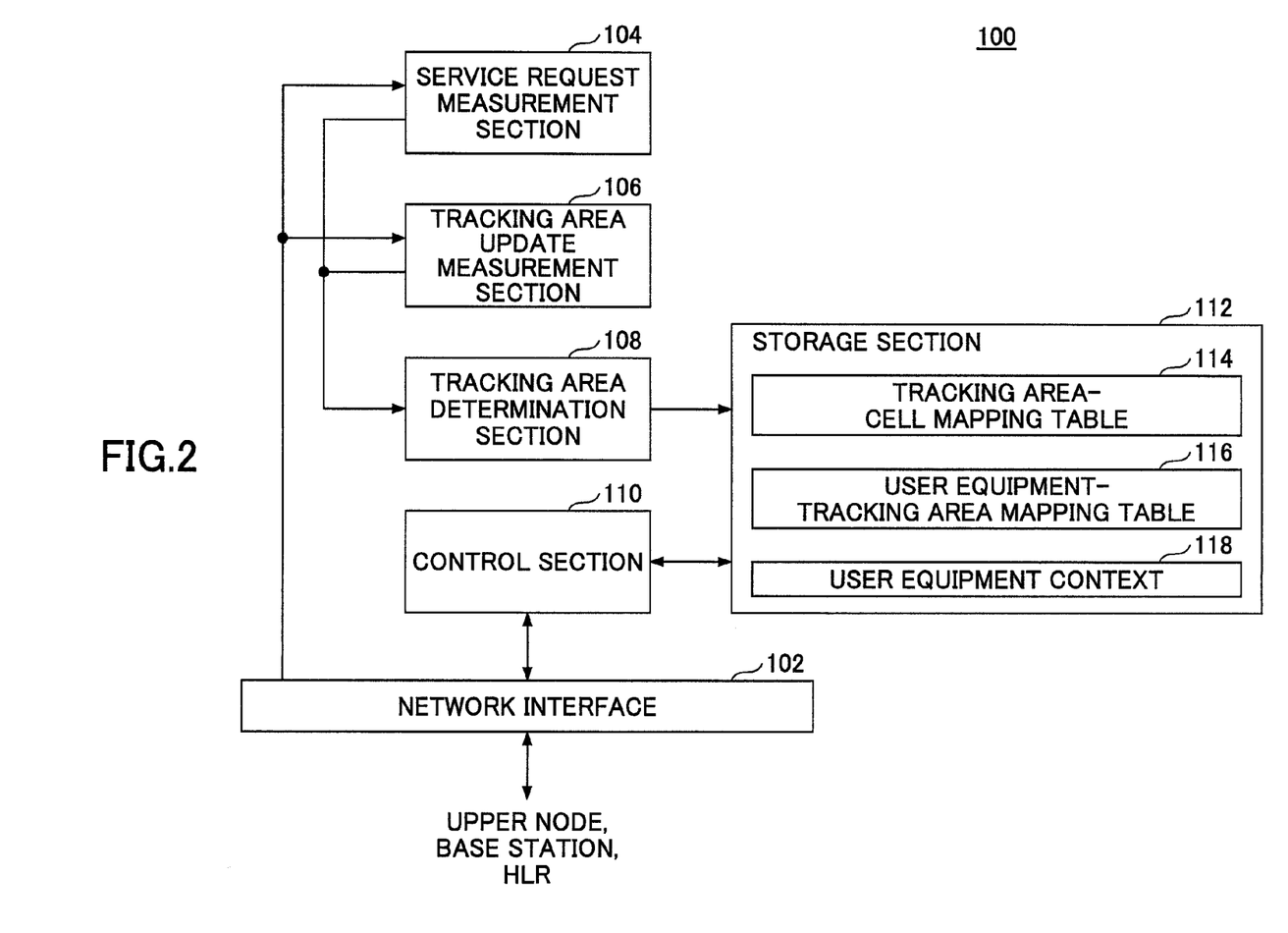
FIG. 2 is a partial block diagram showing the tracking area setting apparatus according to an embodiment of the present invention.

Next, a tracking area setting apparatus 100 according to an embodiment of the present invention is described with reference to FIG. 2. The tracking area setting apparatus 100 designs (constructs, determines) the tracking area.

The tracking area setting apparatus 100 according to this embodiment of the present invention may be included in the access gateway 300. As shown in FIG. 2, the tracking area setting apparatus 100 includes a network interface 102, a service request measurement section 104, a tracking area update measurement section 106, a tracking area determination section 108, a control section 110, and a storage section 112. The storage section 112 includes a tracking area-cell mapping table 114, a user equipment-tracking area mapping table 116, and a user equipment context 118.

Figure 3:
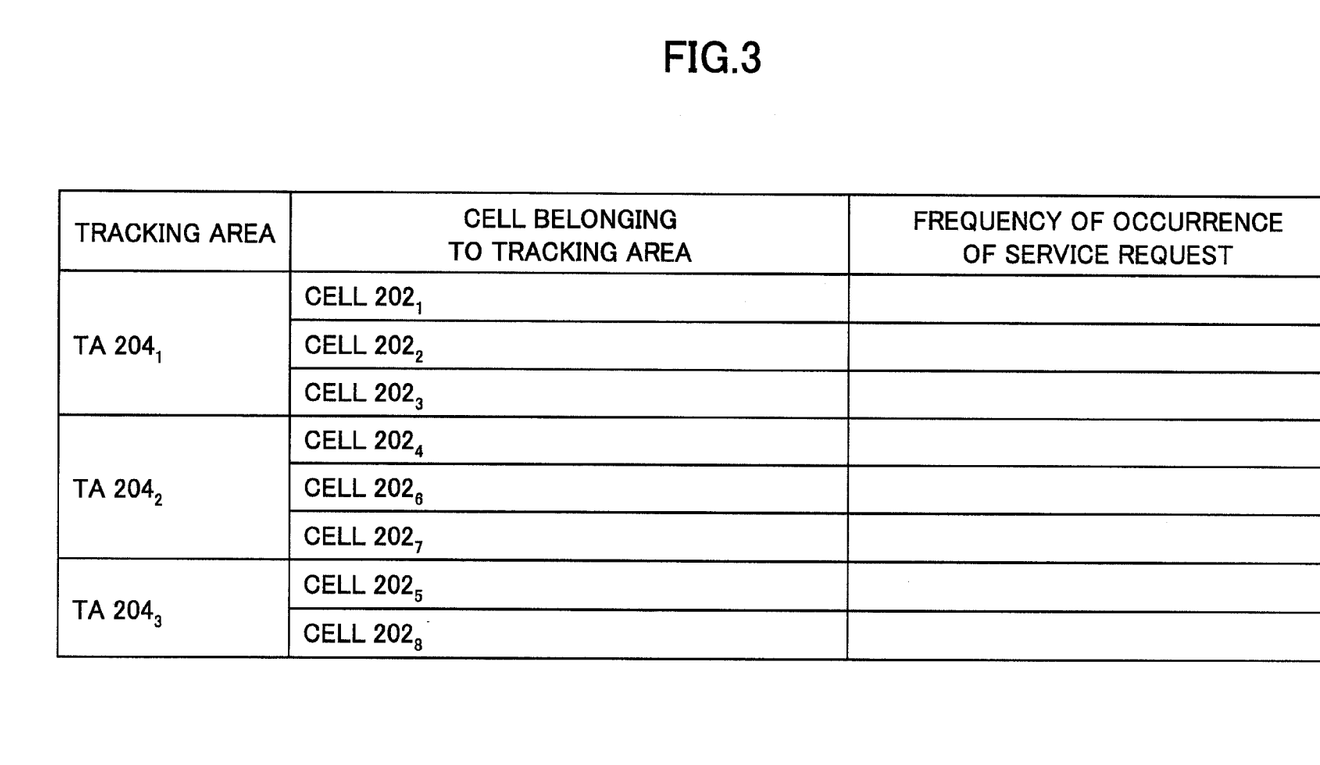
FIG. 3 is a table showing a corresponding relationship among a tracking area, cells belonging to the tracking area, and the frequency of occurrence of the service request.

The service request sent from the user equipment terminal $50_n$ is transmitted to the tracking area setting apparatus 100 through the base station $200_m$. The service request received by the tracking area setting apparatus 100 is input to the service request measurement section 104 through the network interface 102. The service request measurement section 104 measures the frequency of occurrence of the service requests with respect to each cell. For example, the service request measurement section 104 generates a table indicating a corresponding relationship among a tracking area, cells belonging to the tracking area, and the frequency of occurrence of the service requests in the cell (hereinafter referred to as an SR table). The service request measurement section 104 transmits the SR table to the tracking area determination section 108 at a predetermined cycle. However, preferably, the predetermined cycle is long enough from the viewpoint of preventing frequent combinations and divisions of the cells and/or the tracking areas as described below. Otherwise, a system operator may initiate the combinations and the divisions on an as-needed basis.

Further, the tracking area update (TAU) request transmitted from the user equipment terminal $50_n$ is transmitted to the tracking area setting apparatus 100 through the base station $200_m$. The tracking area update (TAU) request received by the tracking area setting apparatus 100 is input into the tracking area update measurement section 106 through the network interface 102.

Figure 4:
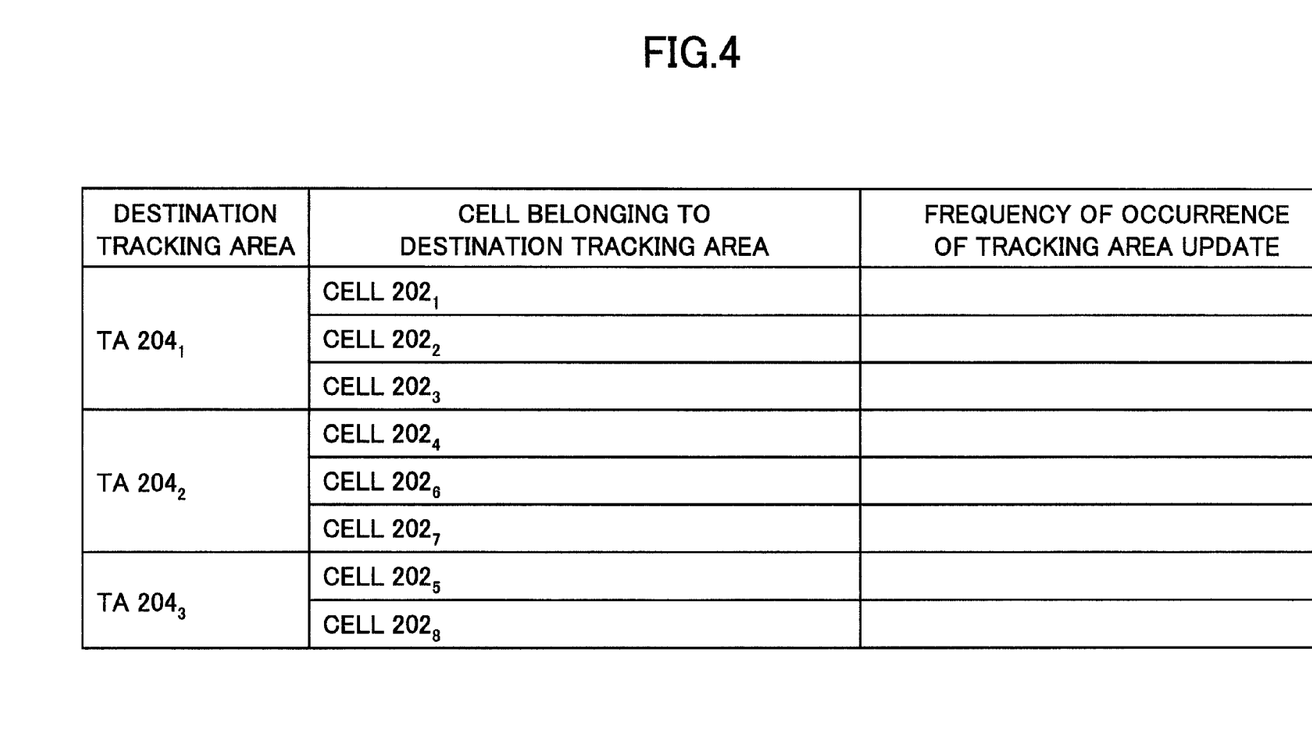
FIG. 4 is a table showing a corresponding relationship among a destination tracking area, cells belonging to the destination tracking area, and the frequency of occurrence of the tracking area update (TAU) (initiated) in the cells.

The tracking area update measurement section 106 measures the frequency of occurrence of the tracking area update (TAU) with respect to each cell belonging to the tracking area. For example, as shown in FIG. 4, the tracking area update measurement section 106 generates a table indicating a corresponding relationship among a destination tracking area, cells belonging to the destination tracking area, and the frequency of occurrence of the tracking area update (TAU) (hereinafter referred to as an TAU table) in the cells. The tracking area update measurement section 106 transmits the TAU table to the tracking area determination section 108 at a predetermined cycle. However, preferably, the predetermined cycle is long enough from the viewpoint of preventing frequent combinations and divisions of the cells and/or the tracking areas. Otherwise, a system operator may initiate the combinations and the divisions on an as-needed basis.

The tracking area determination section 108 optimizes the tracking area (i.e., optimally adjust the corresponding relationship) based on the input SR table and/or TAU table. For example, based on the input SR table, the tracking area determination section 108 may separate a cell in which a value of the frequency of occurrence of the service requests is greater than a predetermined threshold value from the tracking area to which the cell currently belongs. Further, based on the input TAU table, the tracking area determination section 108 may cause a cell in which a value of the frequency of occurrence of the tracking area update (TAU) is greater than a predetermined threshold value to belong to a tracking area surrounding the tracking area to which the cell belongs.

In a case where the paging is performed, even though the user equipment terminal $50_n$ is located only in a specific cell, the paging channels (PCH) are transmitted in plural cells of the tracking area to which the specific cell belongs. Therefore, the paging channels (PCH) transmitted in the cells other than the serving cell of the user equipment terminal $50_n$ are not used. Because of the feature, from the viewpoint of reducing the burden of the transmission of the paging channels (PCH), it may be preferable to reduce the number of cells belonging to a tracking area.

However, when the number of cells belonging to the tracking area is small, the size of the tracking area may become smaller (narrower), resulting in the increasing of the number (frequency) of the tracking area update (TAU) initiated by the user equipment terminals. From the viewpoint of reducing the burden of the tracking area update (TAU), it may be preferable to increase the number of cells belonging to the tracking area.

Therefore, the tracking areas are required to be optimized based on the considerations of the burden of the paging and the burden of the tracking area update (TAU).

To that end, in a tracking area setting apparatus 100 according to an embodiment of the present invention, the tracking area determination section 108 optimizes the tracking areas by referring to the tracking area-cell mapping table 114 stored in the storage section 112 based on the frequency of occurrence of the service requests and the frequency of occurrence of the tracking area update (TAU). From the viewpoint of preventing the frequent combinations and divisions of the cells and/or tracking areas, the optimization is to be performed at a cycle which is long enough. Further, an ON/OFF switch may be provided so that a system operator may turn ON the switch to initiate the optimization. When any of the cells belonging to the tracking area is changed as a result of the optimization of the tracking areas, the tracking area determination section 108 updates the tracking area-cell mapping table 114 and/or the user equipment-tracking area mapping table 116.

The tracking area-cell mapping table 114 indicates a corresponding relationship between the tracking area and the cells belonging to the tracking area. On the other hand, the user equipment-tracking area mapping table 116 indicates a corresponding relationship between the user equipment terminal and the tracking area where the user equipment is located. The user equipment context 118 stores the context information of the receiving user (i.e., user equipment terminal) such as location (registration) information, a type of the user equipment terminal, and available services for the user equipment terminal.

The control section 110 sets a link to the user equipment terminal $50_n$ based on the information (items) stored in the storage section 112. The network interface 102 is for the connection to, for example, an upper node such as the HLR 400, or the base station $200_m$.

Figure 5:
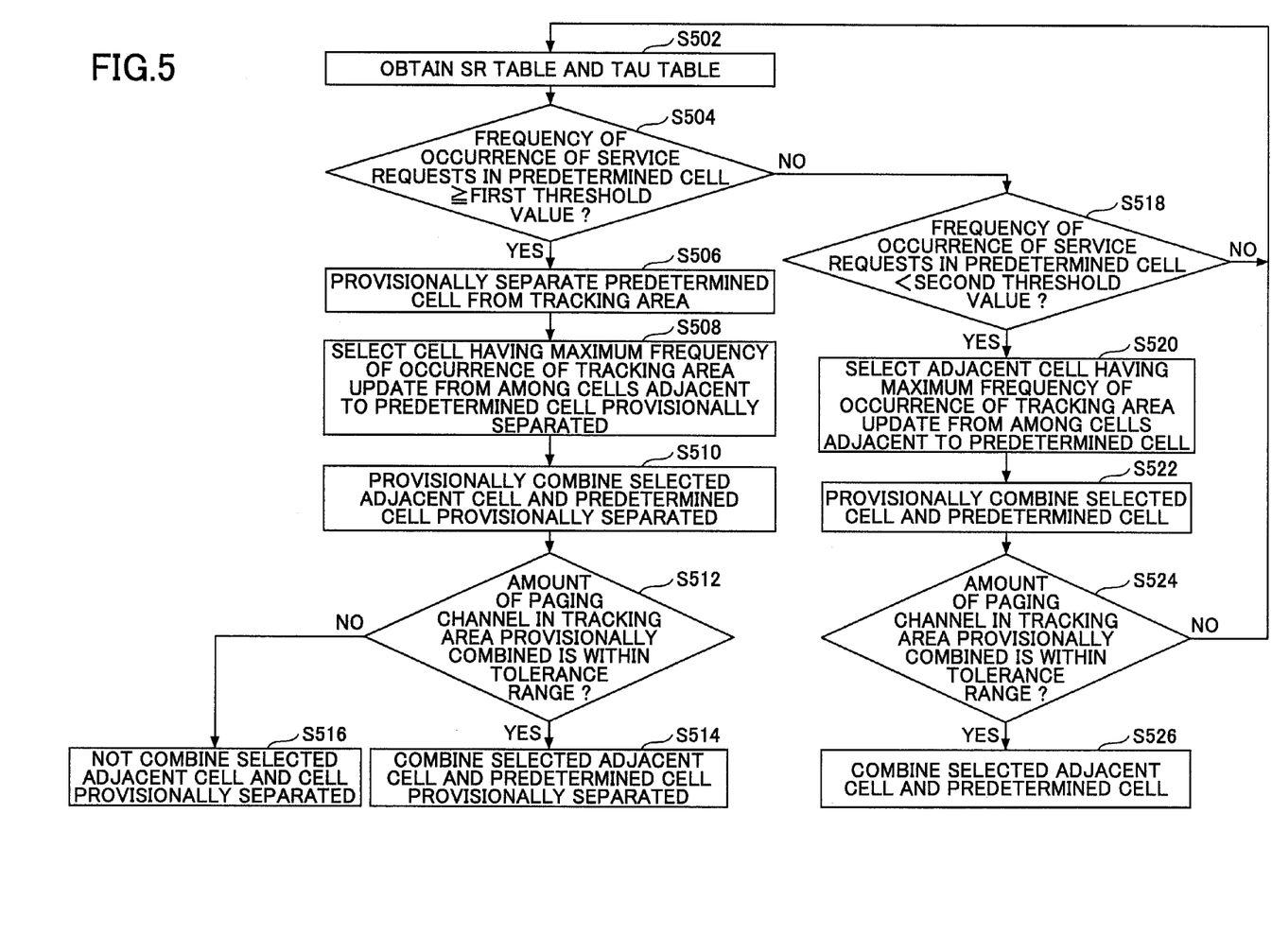
FIG. 5 is a flowchart showing an operation performed by the tracking area setting apparatus according to an embodiment of the present invention.

Next, an exemplary process in the tracking area determination section 108 of the tracking area setting apparatus 100 according to an embodiment of the present invention is described with reference to FIG. 5.

In step S502, the SR table described with reference to FIG. 3 and the TAU table described with reference to FIG. 4 are input to the tracking area determination section 108.

In step S504, it is determined whether a value of the frequency of occurrence of the service requests corresponding to a predetermined cell included in the SR cell is equal to or greater than a first threshold value.

When determining that the value of the frequency of occurrence of the service requests corresponding to the predetermined cell included in the SR cell is equal to or greater than the first threshold value (YES in step S504), in step S506, the predetermined cell is provisionally separated from the tracking area including the predetermined cell (namely, the tracking area to which the predetermined cell belongs).

Next, in step S508, by referring to the TAU table, one adjacent cell having the maximum frequency of occurrence of the tracking area update (TAU) is selected from among the cells adjacent to the predetermined cell having been provisionally separated.

Next, in step S510, the selected adjacent cell and the predetermined cell having been provisionally separated are provisionally combined with each other.

Next, in step S512, it is determined whether an amount of the paging channels (PCH) in the tracking area is within a predetermined tolerance range, the tracking area having been provisionally combined and including the selected adjacent cell and the predetermined cell having been provisionally separated. To that end, for example, by referring to the SR table, a total amount (number) of the frequency of occurrence of the service requests in the tracking area having been provisionally combined is calculated, and it is determined whether the total amount is within a predetermined tolerance range.

When determining that the total amount is within the predetermined tolerance range (YES in step S512), in step S514, the selected adjacent cell and the predetermined cell having been provisionally separated are combined with each other. On the other hand, when determining that the total amount is not within the predetermined tolerance range (NO in step S512), in step S516, the selected adjacent cell and the predetermined cell having been provisionally separated are not combined. Namely, the adjacent cell having been provisionally combined and the predetermined cell having been separated are separated from each other.

Referring back to step S504, when determining that the value of the frequency of occurrence of the service requests corresponding to the predetermined cell included in the SR table is less than the first threshold value (NO in step S504), in step S518, it is determined whether the value of the frequency of occurrence of the service requests corresponding to the predetermined cell included in the SR table is less than a second threshold value. In this case, the second threshold value is less than the first threshold value.

When determining that the value of the frequency of occurrence of the service requests corresponding to the predetermined cell included in the SR table is less than the second threshold value (YES in step S518), by referring to the TAU table, in step S520, one adjacent cell having the maximum frequency of occurrence of the tracking area update (TAU) is selected from among the cells adjacent to the predetermined cell.

Next, in step S522, the selected adjacent cell and the predetermined cell are provisionally combined.

Next, in step S524, it is determined whether an amount of the paging channels (PCH) in the tracking area is within a predetermined tolerance range, the tracking area having been provisionally combined and including the selected adjacent cell and the predetermined cell. To that end, for example, by referring to the SR table, a total amount (number) of the frequency of occurrence of the service requests in the tracking area having been provisionally combined is calculated, and it is determined whether the total amount is within a predetermined tolerance range.

When determining that the total amount is within the predetermined tolerance range (YES in step S524), in step S526, the selected adjacent cell and the predetermined cell are combined each other. On the other hand, when determining that the frequency of occurrence of the service requests corresponding to the predetermined cell included in the SR table is equal to or greater than the second threshold value (NO in step S518) or when determining that the total amount is not within the predetermined tolerance range (NO in step S524), the process goes back to step S502.

By doing like this, it may become possible to optimize the tracking area based on the frequency of occurrence of the service requests and the frequency of occurrence of the tracking area update (TAU).

Further, by optimizing the tracking area not based on the frequency of occurrence of the paging but based on the frequency of occurrence of the service requests, it may become possible to optimize the tracking area based on a cell as a unit.

Next, a tracking area setting apparatus according to another embodiment of the present invention is described.

In a mobile communication system including a tracking area setting apparatus 100, when the user equipment terminal $50_n$ in active mode (in communication) is moved whereby the tracking area where the user equipment terminal $50_n$ is located is changed, the user equipment terminal $50_n$ reports the identifier of a source cell (herein it is assumed that the user equipment terminal $50_n$ moves from a source cell to a destination cell) upon accessing by using an uplink to initiate the update of the location registration.

Further, when the user equipment terminal $50_n$ in idle mode (i.e., waiting for an incoming call) is moved whereby the tracking area where the user equipment terminal $50_n$ is located is changed, the user equipment terminal $50_n$ reports the identifier of the source cell upon accessing by using an uplink to initiate the tracking area update (TAU).

Figure 6:
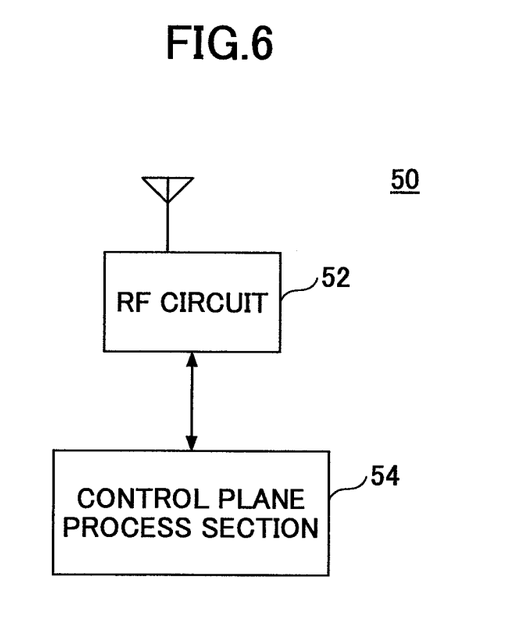
FIG. 6 is a partial block diagram of a user equipment terminal according to an embodiment of the present invention.

As shown in FIG. 6, the user equipment terminal $50_n$ according to the embodiment of the present invention includes an RF circuit 52 and a control plane process section 54 as a cell identifier report unit.

The user equipment terminal $50_n$ performs a cell selection even when the user equipment terminal $50_n$ is in idle mode; therefore the user equipment terminal $50_n$ recognizes the cell where the user equipment terminal $50_n$ is located. In the tracking area update (TAU), the control plane process section 54 transmits the information items including the identifier of the source cell (i.e., the identifier of the cell where the user equipment terminal $50_n$ had been located just before the tracking area update (TAU) is performed).

The configuration of the tracking area setting apparatus according to the embodiment of the present invention is the same as that described with reference to FIG. 2; therefore the descriptions thereof are herein omitted.

The tracking area update (TAU) request including the identifier of the source cell is transmitted from the user equipment terminal $50_n$ to the tracking area setting apparatus 100 through the base station $200_m$. The tracking area update (TAU) request received by the tracking area setting apparatus 100 is input to the tracking area update measurement section 106 through the network interface 102. The tracking area update measurement section 106 measures the frequency of occurrence of the tracking area update (TAU) by associating the cell belonging to the destination tracking area (destination cell) with the corresponding source cell.

Figure 7:
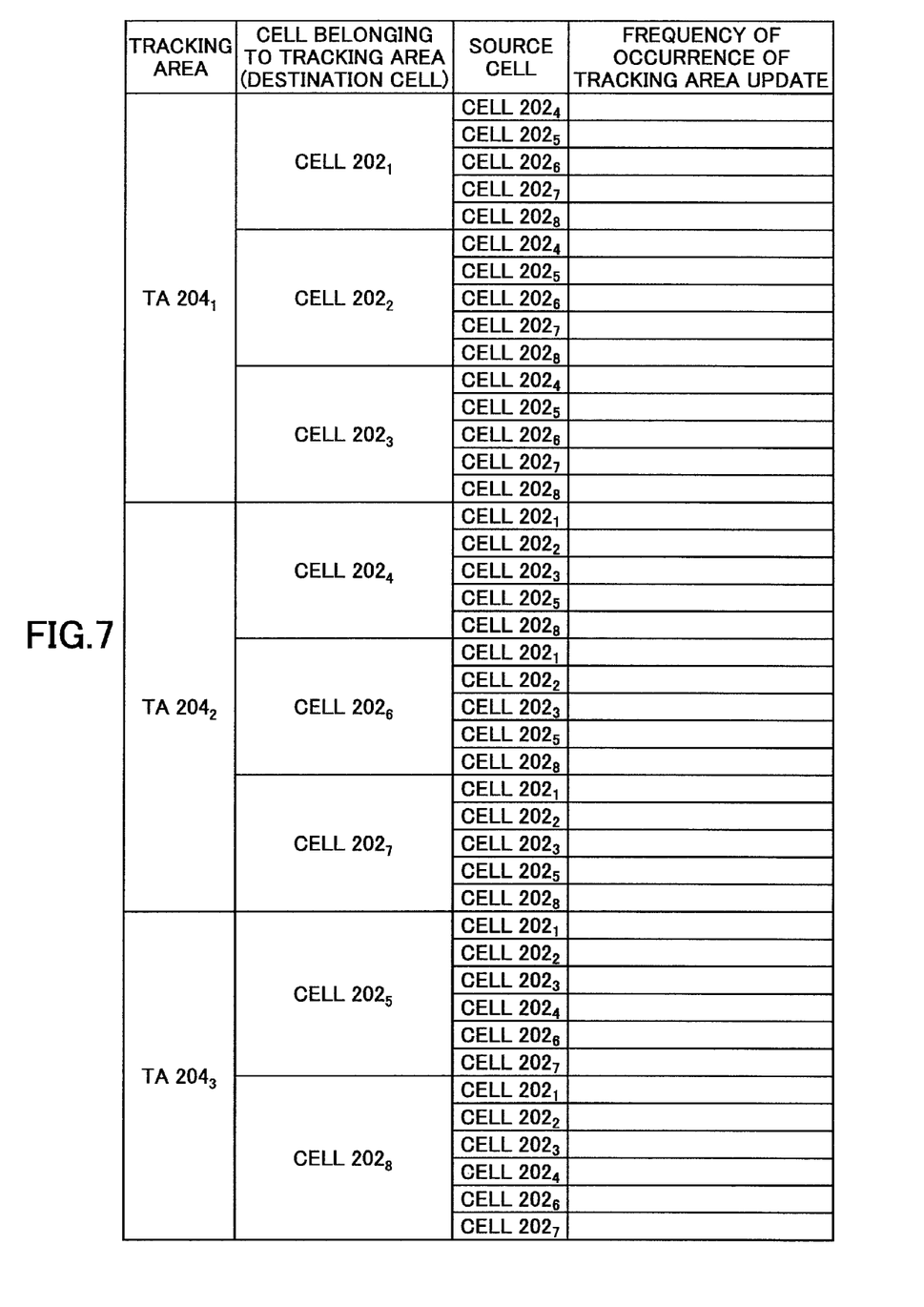
FIG. 7 is a table showing a corresponding relationship among the tracking area, the cell belonging to the destination tracking area (destination cell), the cell where the user equipment terminal had been located just before the user equipment terminal had moved (source cell), and the frequency of occurrence of the tracking area update (TAU) in the tracking area.

For example, as shown in FIG. 7, the tracking area update measurement section 106 generates the TAU table indicating a corresponding relationship among the destination tracking area, the cell belonging to the destination tracking area (destination cell) (namely, the cell where the tracking area update (TAU) is performed), the cell where the user equipment terminal $50_n$ had located just before the user equipment terminal $50_n$ has moved (source cell), and the frequency of occurrence of the tracking area update (TAU) in the tracking area. In the TAU table of FIG. 7, a cell which is not an adjacent cell of the source cell in the actual cell arrangement is included as the destination cell. However, a cell which is not an adjacent cell of the source cell may be omitted as the destination cell in accordance with the actual cell arrangement. In the TAU table of FIG. 7, the value of the frequency of occurrence of the tracking area update (TAU) in the tracking area is zero (0) for the cell which is not an adjacent cell of the source cell in the actual cell arrangement. The tracking area update measurement section 106 transmits (inputs) the TAU table to the tracking area determination section 108 at a predetermined cycle. However, preferably, the predetermined cycle is long enough from the viewpoint of preventing frequent combinations and divisions of the cells and/or the tracking areas. Otherwise, a system operator may initiate the combinations and the divisions on an as-needed basis.

Figure 8:
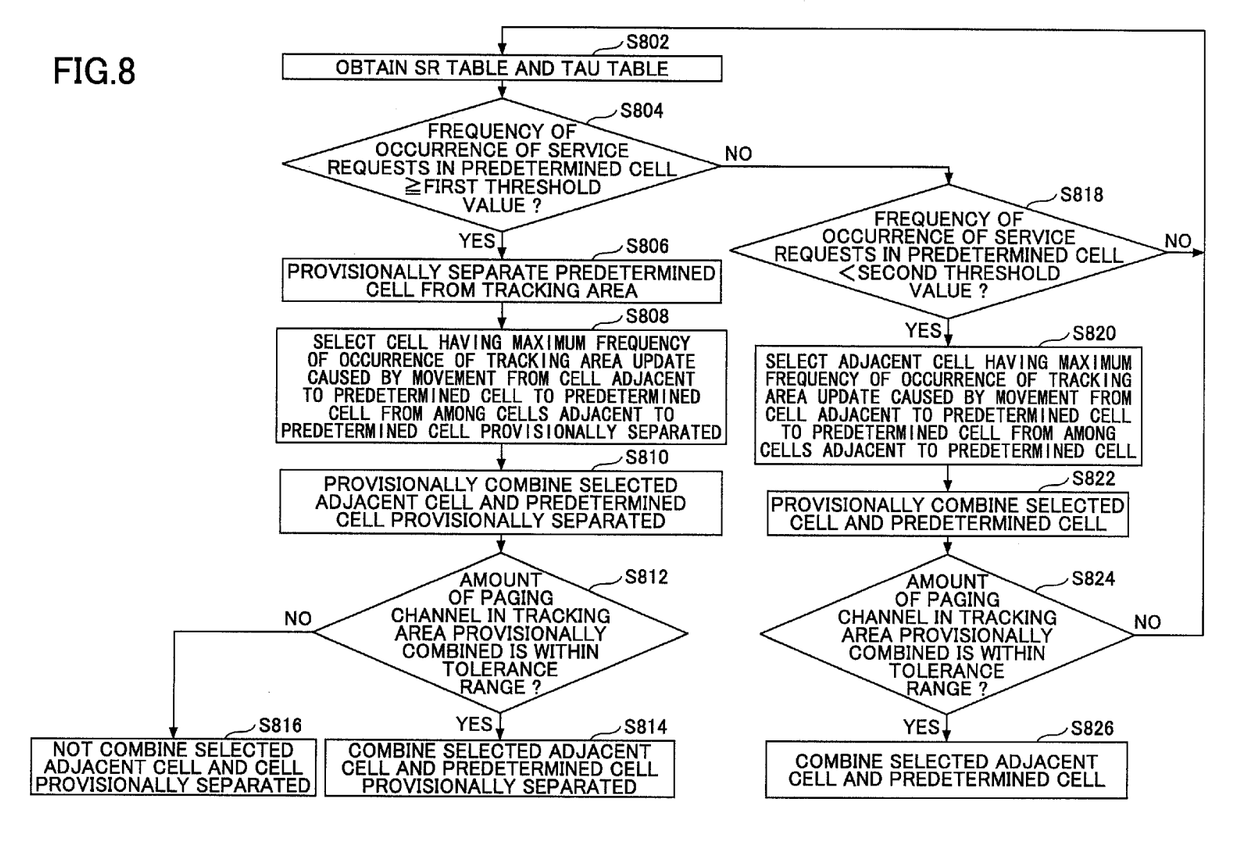
FIG. 8 is a flowchart showing an operation performed by the tracking area setting apparatus according to an embodiment of the present invention.

Next, an exemplary process in the tracking area determination section 108 of the tracking area setting apparatus 100 according to an embodiment of the present invention is described with reference to FIG. 8.

In step S802, the SR table described with reference to FIG. 3 and the TAU table described with reference to FIG. 7 are input to the tracking area determination section 108.

In step S804, it is determined whether a value of the frequency of occurrence of the service requests corresponding to a predetermined cell included in the SR cell is equal to or greater than a first threshold value.

When determining that the value of the frequency of occurrence of the service requests corresponding to the predetermined cell included in the SR cell is equal to or greater than the first threshold value (YES in step S804), in step S806, the predetermined cell is provisionally separated from the tracking area including the predetermined cell.

Next, in step S808, by referring to the TAU table, one adjacent cell is selected having the maximum frequency of occurrence of the tracking area update (TAU) caused by the movement from the cell adjacent to the predetermined cell having been provisionally separated to the predetermined cell having been provisionally separated from among the cells adjacent to the predetermined cell having been provisionally separated (adjacent cell).

Next, in step S810, the selected adjacent cell and the predetermined cell having been provisionally separated are provisionally combined with each other.

Next, in step S812, it is determined whether an amount of the paging channels (PCH) in the tracking area is within a predetermined tolerance range, the tracking area having been provisionally combined and including the selected adjacent cell and the predetermined cell having been provisionally separated. To that end, for example, by referring to the SR table, a total amount (number) of the frequency of occurrence of the service requests in the tracking area having been provisionally combined is calculated, and it is determined whether the total amount is within a predetermined tolerance range.

When determining that the total amount is within the predetermined tolerance range (YES in step S812), in step S814, the selected adjacent cell and the predetermined cell having been provisionally separated are combined with each other. Namely, a tracking area is constituted by the selected adjacent cell and the predetermined cell having been provisionally separated. On the other hand, when determining that the total amount is not within the predetermined tolerance range (NO in step S812), in step S816, the selected adjacent cell and the predetermined cell having been provisionally separated are not combined. Namely, the adjacent cell is returned to the tracking area to which the adjacent cell had belonged before the provisional combination, and the predetermined cell having been separated constitutes a tracking area.

Referring back to step S804, when determining that the value of the frequency of occurrence of the service requests corresponding to the predetermined cell included in the SR table is less than the first threshold value (NO in step S804), in step S818, it is determined whether the value of the frequency of occurrence of the service requests corresponding to the predetermined cell included in the SR table is less than a second threshold value. In this case, the second threshold value is less than the first threshold value.

When determining that the value of the frequency of occurrence of the service requests corresponding to the predetermined cell included in the SR table is less than the second threshold value (YES in step S818), by referring the TAU table, in step S820, one adjacent cell is selected having the maximum frequency of occurrence of the tracking area update (TAU) caused by the movement from the cell adjacent to the predetermined cell to the predetermined cell from among the cells adjacent to the predetermined cell.

Next, in step S822, the selected adjacent cell and the predetermined cell are provisionally combined.

Next, in step S824, it is determined whether an amount of the paging channels (PCH) in the tracking area is within a predetermined tolerance range, the tracking area having been provisionally combined and including the selected adjacent cell and the predetermined cell. To that end, for example, by referring to the SR table, a total amount (number) of the frequency of occurrence of the service requests in the tracking area having been provisionally combined is calculated, and it is determined whether the total amount is within a predetermined tolerance range.

When determining that the total amount is within the predetermined tolerance range (YES in step S824), in step S826, the selected adjacent cell and the predetermined cell are combined with each other. On the other hand, when determining that the value of the frequency of occurrence of the service requests corresponding to the predetermined cell included in the SR table is equal to or greater than the second threshold value (NO in step S518) or when determining that the total amount is not within the predetermined tolerance range (NO in step S824), the process goes back to step S802.

By doing like this, it may become possible to optimize the tracking area based on the frequency of occurrence of the service requests and the frequency of occurrence of the tracking area update (TAU).

Further, it may become possible to reduce the frequency of occurrence of the tracking area update (TAU).

In this embodiment of the present invention, in steps S808 and S820, a case is described where one adjacent cell is selected having the maximum frequency of occurrence of the tracking area update (TAU) caused by the movement from the cell adjacent to the predetermined cell to the predetermined cell from among the cells adjacent to the predetermined cell. Alternatively, one adjacent cell may be selected having the maximum frequency of occurrence of the tracking area update (TAU) caused by the movement from the predetermined cell to the cell adjacent to the predetermined cell from among the cells adjacent to the predetermined cell.

Further alternatively, one adjacent cell may be selected having the maximum sum of the frequency of occurrence of the tracking area update (TAU) caused by the movement from the cell adjacent to the predetermined cell to the predetermined cell and the frequency of occurrence of the tracking area update (TAU) caused by the movement from the predetermined cell to the cell adjacent to the predetermined cell from among the cells adjacent to the predetermined cell.

In the above embodiments, it is assumed that the tracking area setting apparatus is provided in the access gateway. However, when the access gateway 300 includes the MME/UPE, the tracking area setting apparatus may be provided in the MME/UPE. Further, when an OAM (Operation And Maintenance) server is provided in a mobile communication system having the tracking area setting apparatus, the tracking area setting apparatus may be provided in the OAM server. By having the OAM server, it may become possible to optimize the tracking areas having the cells of the base stations managed by plural access gateway devices.

Although the invention has been described with reference to the embodiments, it should not be understood that the descriptions and the drawings constituting part of this disclosure limit the scope of the present invention. It is apparent to those skilled in the art that the various alternatives, modifications, and practices can be achieved based on this disclosure.

Namely, needless to say, the present invention includes various embodiments and the like that are not described in the description. Therefore, the technical scope of the present invention is defined by claims appropriate for the above descriptions.

In the above description, the present invention is described by separated several embodiments. However, the separation of the present invention into several embodiments is not an essential to the present invention. For example, two or more embodiments may be combined on as as-needed basis. To promote an understanding of the present invention, specific values are used as examples throughout the description. However, such specific values are just sample values unless otherwise described, and any other values may be used.

The present invention is described by referring to specific embodiments. However, a person skilled in the art may understand that the above embodiment is described for illustrative purpose only and may think of examples of various modifications, transformations, alterations, changes and the like. For illustrative purposes, the apparatus according to an embodiment of the present invention is described with reference to the functional block diagrams. However, such an apparatus may be provided by hardware, software, or a combination thereof. The present invention is not limited to the embodiment described above, and various modifications, transformations, alteration, exchanges, and the like may be made without departing from the scope and spirit of the present invention.

The present international application claims priority from Japanese Patent Application No. 2007-024894 filed on Feb. 2, 2007, the entire contents of Japanese Patent Application No. 2007-024894 are hereby incorporated herein by reference.

The invention claimed is:

1. A tracking area setting apparatus comprising:
one or more processors;
wherein the one or more processors are configured to:
measure a frequency of occurrence of a service request transmitted by a user equipment terminal to a cell where the user equipment terminal is located based on a paging channel transmitted in all cells belonging to a tracking area where the user equipment terminal is located and where an identifier of the tracking area is reported from each cell of the tracking area, the user equipment terminal being a target user equipment terminal to receive a call and updating location registration based on the reported identifier of the tracking area, the tracking area including one or more cells;
measure a frequency of occurrence of the location registration; and
make a first determination whether a number of the frequency of occurrence of the service request in a first cell is equal to or greater than a first threshold value based on the frequency of occurrence of the service request,
separate, based on the first determination that the number of frequency of occurrence of the service request in the first cell is equal to or greater than the first threshold value, the first cell from the tracking area to which the first cell belongs,
based on the first determination, select a second cell having a maximum frequency of updating the location registration among cells adjacent to the first cell,
make a second determination whether the second cell is to be combined with the first cell into a same tracking area,
select, based on the first determination that the number of frequency occurrence of the service request in the first cell is less than the first threshold value and less than a second threshold value which is less than the first threshold value, a second cell having a maximum frequency of updating the location registration among cells adjacent to the first cell, and
make a third determination whether the second cell is to be combined with the first cell into a same tracking area.

2. The tracking area setting apparatus according to claim 1, wherein the update of the location registration is initiated by the user equipment terminal based on an identifier of the tracking area, the identifier being reported from each cell of each tracking area, and
wherein the one or more processors are further configured to select the second cell having a maximum frequency of updating of the location registration based on the frequency of updating of the location registration from among cells adjacent to the first cell having been separated, and determines whether the first cell having been separated and the second cell are to be combined so as to belong to a same tracking area.

3. The tracking area setting apparatus according to claim 2, wherein the one or more processors are further configured to estimate a value of a frequency of occurrence of a service request in the tracking area to which the second cell belongs, the cell being combined between the first cell having been separated and the second cell, and based on the value of the estimation, determines whether the first cell having been separated and the selected cell are to be combined.

4. The tracking area setting apparatus according to claim 1, wherein the update of the location registration is initiated by the user equipment terminal based on an identifier of the tracking area, the identifier being reported from each cell of each tracking area, the user equipment terminal reporting an information item indicating a cell where the user equipment terminal had been located just before the location registration upon the update of the location registration being initiated, and the one or more processors are further configured to select the second cell having a maximum frequency of updating of the location registration based on the frequency of updating of the location registration from among the cells adjacent to the first cell having been separated, the updating of the location registration being caused by a movement from the cell adjacent to the first cell having been separated to the first cell having been separated, and determines whether the first cell having been separated and the second cell are to be combined so as to belong to a same tracking area.

5. The tracking area setting apparatus according to claim 1, wherein the update of the location registration is initiated by the user equipment terminal based on an identifier of the tracking area, the identifier being reported from each cell of each tracking area, the user equipment terminal reporting an information item indicating a cell where the user equipment terminal had been located just before the location registration upon the update of the location registration being initiated, and the one or more processors are further configured to select the second cell having a maximum frequency of updating of the location registration based on the frequency of updating of the location registration from among the cells adjacent to the first cell having been separated, the updating of the location registration being caused by a movement from the first cell having been separated to the cells adjacent to the first cell having been separated, and determines whether the first cell having been separated and the second cell are to be combined so as to belong to a same tracking area.

6. A tracking area setting method comprising:

transmitting, from a base station, a paging channel in each of one or more cells belonging to a tracking area where a target user equipment terminal to receive a call is located;

reporting an identifier of the tracking area from each cell of the tracking area;

updating location registration based on the reported identifier of the tracking area;

transmitting a service request to a cell where the user equipment terminal is located based on the paging channel from the user equipment terminal;

measuring a frequency of occurrence of the service request with a tracking are setting apparatus;

measuring a frequency of occurrence of the location registration with a location registration measurement unit;

a service request occurrence frequency determination step in which, based on the frequency of occurrence of the service request, the tracking area setting apparatus determines whether the frequency of occurrence of the service request in a first cell is equal to or greater than a first value;

a tracking area separation step in which, when making a first determination that the frequency of occurrence of the service request in the first cell is equal to or greater than the first value, the tracking area setting apparatus separates the first cell from the tracking area to which the first cell belongs;

selecting, based on the first determination, a second cell having a maximum frequency of updating the location registration among cells adjacent to the first;

making a second determination whether the second cell is to be combined with the first cell into a same tracking area;

selecting, based on the first determination that the number of frequency occurrence of the service request in the first cell is less than the first threshold value and less than a second threshold value which is less the first threshold value, a second cell having a maximum frequency of updating the location registration among cells adjacent to the first cell, and making a third determination whether the second cell is to be combined with the first cell into a same tracking area.

* * * * *